Patented Aug. 16, 1938

2,126,725

UNITED STATES PATENT OFFICE 2,126,725

METHOD OF PRODUCING TRANSLUCENT STONE SLABS

Raymond C. Briant, Pittsburgh, Pa., and George W. Bain, Amherst, Mass., assignors to Vermont Marble Company, Proctor, Vt., a corporation of Vermont No Drawing. Application May 15, 1937, Serial No. 142,882

5 Claims. (Cl. 125—1)

This invention relates to translucent marble slabs and to a method of producing them.

There is a steadily increasing demand for highly translucent stone, particularly marble slabs, for architectural uses wherein the slabs are illuminated from one or both sides by natural or artificial light. Such uses include luminaires and illuminated panels, walls, spandrels and table tops. In addition to the luminosity of translucent slabs, the translucency brings out the veining and coloring in stones whose value depends largely upon their appearance, and thereby increases their value. However, there has apparently been no satisfactory way of producing at will stone slabs having sufficient translucency for these purposes, and they have therefore been expensive as well as difficult to obtain. In fact, they have been practically unobtainable.

It is among the objects of this invention to provide a method of producing translucent marble slabs by cutting them from a body of marble in such a plane that they possess a high degree of translucency. Another object is to provide a translucent slab produced by that method.

This invention is predicated upon our discovery that the translucency, or the degree of translucency, of a slab of marble is dependent upon the relation of the plane of the slab to its crystal structure, and more particularly to the orientation of the optic axes and longest axes of its crystals and the least mean distance between the crystals. Therefore, a thin marble slab having the greatest possible translucency for its thickness can be produced at will by first studying the crystal structure of a body of marble from which the slab is to be cut, and which may be in a quarry or be a block cut therefrom, and then cutting said body in a plane having a certain predetermined relation to the crystal arrangement thus determined. The crystal structure or arrangement is determined in part preferably by a petrographic microscopic examination of the marble during which the orientation of the optic axes, as well as the orientation of the longest axes of the crystals are observed. The least mean distance between the crystals is preferably estimated by directional absorption rate tests or some similar method.

In the absence of modifying factors, more light passes through any one of the crystals forming a slab of marble in a direction that is perpendicular to the optic axis of that crystal than in any other direction. Therefore, if optic axes were the only factor to contend with in seeking a high degree of translucency in a marble slab, the slab should be cut so that the plane of the slab is parallel to the mean or preferred direction of the optic axes of the crystals forming the marble. The path of light passing through the slab would then be perpendicular to the optic axes of more crystals than it would be parallel to, and a degree of translucency approaching the maximum for that slab would be obtained. Aside from the plane referred to being parallel to the preferred direction of the optic axes, it does not have a unique position because it can be rotated to any position around a line representing said preferred direction and still be parallel to that line.

"Mean or preferred direction" refers not only to a line to which more optic axes are parallel than any other line, but also refers, when there is random orientation as far as any line is concerned, to a plane to which more optic axes are parallel than any other plane.

On the other hand, if optic axes and other factors are not considered, it is found that light travels through a block of marble most easily in a direction parallel to the preferred direction of the longest axes of the crystals making up the block. This is because there can be fewer crystals disposed end to end than side by side in a given thickness of marble, wherefore there are fewer spaces or voids between crystals in the former arrangement than in the latter. It is the refraction and reflection of a light beam in passing from crystal to crystal through an intervening medium of different density that diminishes the amount of light that travels entirely through the marble, so the fewer the number of times the light encounters such a medium the more light that passes through the marble and the greater the translucency. Consequently, the plane of the marble slab should be perpendicular to the preferred direction of the longitudinal axes of the crystals, and the position of this plane is unique because it can assume only one position and still be perpendicular to a given line.

Again, if no other factors are considered, it is found that light travels through a block of marble most easily in a direction parallel to the direction taken by the least mean distance between the crystals. This is because, within certain limits, the wider the space between any two crystals the more the light passing therethrough is refracted and reflected. The proper way to cut such a block of marble to obtain a slab having a high degree of translucency is therefore perpendicular to the direction just mentioned.

If any two of these crystal structure or arrangement factors are considered together, and the third one ignored, it is possible, but not probable, to have a condition where the plane of the slab will bear the optimum relation to the factors thus considered. Thus, if the preferred direction of the optic axes of the crystals is perpendicular to the preferred direction of the longitudinal axes of the crystals, or to the direction in which the mean distance between the crystals is least, and the plane of the slab is perpendicular to either the second or third direction factor, it must be parallel to the first which is just what is desired for maximum translucency. Again if the preferred direction of the longitudinal axes of the crystals is parallel to the preferred direction of least mean distance between the crystals, and the plane of the slab is perpendicular to one direction factor it is also perpendicular to the other, which is the best condition for translucency.

However, these ideal conditions are rarely, if ever, present, and it is therefore generally necessary to compromise and cut the slab in a plane which bears the desired relation as nearly as possible to the two direction factors. In case the two direction factors are of equal importance, the plane of the slab should then vary from its otherwise optimum position, relative to each factor taken individually, the same number of degrees. This position of the plane of the slab, if the preferred direction of the optic axes is considered with only the preferred direction of the longitudinal axes or with only the preferred direction of least mean distance between the crystals, is perpendicular to a line bisecting the minimum angle between a line perpendicular to the first direction factor and another line parallel to either the second or the third direction factor, as the case may be. In other words, the plane of the slab is perpendicular to a line coinciding as nearly as possible with a line perpendicular to the first direction factor and another line parallel to either the second or third direction factor.

Expressing the first condition in terms of a formula, and having $p_1$, $p_2$, $p_3$ denote the direction cosines of the preferred direction of the optic axes and $l_1$, $l_2$, $l_3$ denote the direction cosines of the preferred direction of the longitudinal axes, then the plane of cutting to obtain a slab of a high degree of translucency is perpendicular to a line making an angle $x$ with the second-mentioned direction and an angle $x$ with a line perpendicular to the first-mentioned direction. This angle $x$ is determined as follows:

$$x = \tfrac{1}{2} \text{ arc sine } (p_1 l_1 + p_2 l_2 + p_3 l_3)$$

With the second condition stated, letting $m_1$, $m_2$, $m_3$ denote the direction cosines of the direction of least mean distance between the crystals, the angle $y$ that determines the position of the line perpendicular to which the slab is cut is found as follows:

$$y = \tfrac{1}{2} \text{ arc sine } (p_1 m_1 + p_2 m_2 + p_3 m_3)$$

The position of the plane of cutting, when only the preferred direction of the longitudinal axes of the crystals and the direction of least mean distance between the crystals is considered, is in a plane perpendicular to a line bisecting the minimum angle between these two directions. Here again the line referred to coincides as nearly as possible with the two directions last mentioned. Representing the direction cosines of these two direction factors in the same way as before, the angle $z$ that determines the position of the line perpendicular to which the slab is cut is found as follows:

$$z = \tfrac{1}{2} \text{ arc cosine } (l_1 m_1 + l_2 m_2 + l_3 m_3)$$

The methods and formulas set forth above for determining the plane in which to cut a slab of marble to insure a high degree of translucency are of value only when two direction factors are considered. Generally, all three direction factors referred to, not merely two, should be considered in determining the plane of cutting. However, the foregoing descriptive matter will make clearer the problem actually encountered in practice, and will likewise make its solution more understandable.

If it were true that in every block of marble the preferred direction of the longitudinal axes coincided with the direction of least mean distance between the crystals and was perpendicular to the preferred direction of the optic axes, it would only be necessary to cut the block in a plane perpendicular to the first direction to obtain a slab of the highest translucency. Such a plane would then be perpendicular to the second direction and parallel to the third, the best possible condition. However, this ideal condition probably does not exist, and therefore it is necessary to seek a happy medium which is found in the following manner.

As set forth above, the preferred direction of the longitudinal axes of the crystals and the direction of least mean distance between the crystals each individually calls for a plane of cutting perpendicular thereto to obtain a slab of maximum translucence. Likewise, the preferred direction of the optic axes of the crystals calls for a plane of cutting parallel thereto, but as the position of such a plane is not unique in itself, as mentioned before, its position must be made unique before a definite determination can be made in connection with the two directions referred to in the preceding sentence.

Expressed in another way, the plane of cutting to produce a slab of maximum translucency should coincide as nearly as possible with the three planes mentioned in the preceding paragraph. However, before the position of the plane of the slab is determined it is necessary to locate in the best possible position the imaginary plane parallel to the preferred direction of the optic axes of the crystals. This best possible position is, of course, one coinciding as nearly as possible with the imaginary planes perpendicular to the preferred direction of the longest axes of the crystals and to the direction of least mean distance between the crystals. The best plane in which to cut the marble is then in one coinciding as nearly as possible with all three of these imaginary planes.

In other words, as a plane parallel to the preferred direction of the optic axes is perpendicular to a line in a plane perpendicular to that direction, the proper position for that line is coinciding as nearly as possible with the preferred direction of the longitudinal axes and the direction of least mean distance between the crystals. The marble should then be cut in a plane perpendicular to a direction coinciding as nearly as possible with the line just referred to and the preferred direction of the longitudinal axes and the direction of least mean distance between the crystals.

The term "as nearly as possible" used herein will be understood by those skilled in the art to mean a location the sum of the squares of the distance between which and any other two locations under consideration is least. Therefore, the term has a definite meaning. In this particular invention the direction perpendicular to which the plane of the slab lies, and which coincides as nearly as possible with the unique line perpendicular to the preferred direction of the optic axes and also with the preferred direction of the longitudinal axes and the direction of least mean distance between the crystals, can be found, if desired, by bisecting the three angles formed between lines connecting in a common plane the unique line and last two directions just mentioned. This desired direction that is sought extends through the intersection of the three bisecting lines and the intersection of the three principal direction factors referred to throughout this description.

This last-discussed condition in which all three principal direction factors must be taken into consideration, and which is generally the condition met with in practice, is expressed in part in terms of a formula as follows:

$$c = \arcsin \sqrt{\frac{(p_i l_i)^2 - (p_i l_i)^2 (l_i m_i)^2 + 4(p_i m_i)(p_i l_i)^2 (l_i m_i)^2 - 4(p_i m_i)^2 (p_i l_i)^4}{(p_i l_i)^2 - 4(p_i m_i)^2 (p_i l_i)^2 + (p_i m_i)^2 + 2(p_i l_i)(p_i m_i)(m_i l_i)}}$$

This formula is for the purpose of locating the unique or proper position for the line perpendicular to the preferred direction of the optic axes of the crystals, and "c" denotes the angle between that line and the preferred direction of the longitudinal axes of the crystals. Determination of angle c therefore locates the line in proper position, and that position is such that the line coincides as nearly as possible with the preferred direction of the longitudinal axes of the crystals and the least mean distance between them, which is what was desired to be found.

Mathematicians, or those skilled in the art, will understand that $$p_i l_i = p_1 l_1 + p_2 l_2 + p_3 l_3$$

that $$p_i m_i = p_1 m_1 + p_2 m_2 + p_3 m_3$$

and that $$l_i m_i = l_1 m_1 + l_2 m_2 + l_3 m_3.$$

With angle c determined, and by it the location of the line perpendicular to the preferred direction of the optic axes of the crystals, it is then a simple matter to locate in the manner set forth hereinbefore the direction perpendicular to which the translucent slab is cut.

This invention has made it possible to ascertain how to cut slabs of marble in order to give them a high degree of translucency. The plane of cutting can be determined, after examination of the marble for crystal structure and orientation, either by mathematical formulas or by producing diagrams, or by both. In any event, the plane of proper cutting is found in advance, and the production of highly translucent slabs does not, therefore, depend upon chance. Consequently, translucent slabs can be produced at will so that they are made much more plentiful than heretofore, resulting in greater translucency at less cost.

According to the provisions of the patent statutes, we have explained the principle of our invention. However, we desire to have it understood that, within the scope of the appended claims, the invention may be practiced otherwise than as specifically described.

We claim:

1. The method of producing a translucent marble slab, comprising studying the structure and arrangement of the crystals forming a body of marble from which the slab is to be cut and then cutting said body in a plane substantially perpendicular to a direction coinciding as nearly as possible with a line perpendicular to the preferred direction of the optic axes of the crystals forming the slab, with the preferred direction of the longitudinal axes of said crystals, and with the direction in which the mean distance between said crystals is least, said line coinciding as nearly as possible with said last two directions.

2. The method of producing a translucent marble slab from a body of marble, comprising determining the preferred direction of the longitudinal axes of the crystals forming said body, determining the direction in which the mean distance between said crystals is least, determining the location of a line perpendicular to the preferred direction of the optic axes of said crystals and coinciding as nearly as possible with said first two directions, bisecting the three angles between said first two directions and said line, and cutting a slab from said body of marble in a plane substantially perpendicular to a line passing through the point of intersection of the bisectors of said angles and through the point of intersection of said three directions.

3. The method of producing a translucent marble slab from a body of marble comprising determining the preferred direction of the longitudinal axes of the crystals forming said body, determining the location of a line perpendicular to the preferred direction of the optic axes of said crystals, and cutting a slab from said body of marble in a plane substantially perpendicular to a line bisecting the minimum angle between said first direction and first line.

4. The method of producing a translucent marble slab from a body of marble, comprising determining the preferred direction of the longitudinal axes of the crystals forming said body, determining the direction in which the mean distance between said crystals is least, and cutting a slab from said body of marble in a plane substantially perpendicular to a line bisecting the minimum angle between said two directions.

5. The method of producing a translucent marble slab from a body of marble, comprising determining the direction of the least mean distance between the crystals forming said body, determining the location of a line perpendicular to the preferred direction of the optic axes of said crystals, and cutting a slab from said body of marble in a plane substantially perpendicular to a line bisecting the minimum angle between said first direction and first line.

RAYMOND C. BRIANT.
GEORGE W. BAIN.